United States Patent

Clymer

[11] Patent Number: 5,558,164
[45] Date of Patent: Sep. 24, 1996

[54] COLLAPSIBLE TOOL BAR FOR AGRICULTURAL IMPLEMENTS

[76] Inventor: Larry R. Clymer, 214 N. Broadway, Columbus Grove, Ohio 45830

[21] Appl. No.: 377,972

[22] Filed: Jan. 25, 1995

[51] Int. Cl.⁶ .................................................. A01B 49/00
[52] U.S. Cl. ............................ 172/311; 172/456; 16/367; 16/371; 16/287
[58] Field of Search ..................... 172/311, 616, 172/617, 456, 459; 16/366, 367, 371, 287

[56] References Cited

U.S. PATENT DOCUMENTS

| | | | |
|---|---|---|---|
| 3,422,909 | 1/1969 | Jacobs | 172/456 |
| 3,505,704 | 4/1970 | Hornung et al. | 16/367 |
| 3,529,674 | 9/1970 | Todd et al. | 172/456 |
| 3,542,138 | 11/1970 | Fackler | 172/311 |
| 3,948,327 | 4/1976 | Parker et al. | 172/311 |
| 4,030,551 | 6/1977 | Boettoi et al. . | |
| 4,042,044 | 8/1977 | Honnold | 172/311 |
| 4,046,203 | 9/1977 | Ward . | |
| 4,058,170 | 11/1977 | Ankenman et al. | 172/311 |
| 4,061,195 | 12/1977 | Pryor . | |
| 4,074,766 | 2/1978 | Orthman . | |
| 4,194,573 | 3/1980 | Rettkowski . | |
| 4,328,869 | 5/1982 | Perelli | 172/459 |
| 4,466,492 | 8/1984 | Steinberg . | |
| 4,496,004 | 1/1985 | Frase et al. . | |
| 4,632,417 | 12/1986 | Hodapp | 172/311 |
| 4,700,784 | 10/1987 | Wiebe et al. . | |
| 4,821,809 | 4/1989 | Summach et al. | 172/311 |
| 4,825,958 | 5/1989 | Kelderman et al. | 172/311 |
| 4,883,126 | 11/1989 | Leland . | |
| 4,915,014 | 4/1990 | Gilmore et al. . | |
| 5,062,489 | 11/1991 | Adee | 172/311 |
| 5,154,240 | 10/1992 | Carrick | 172/311 |

*Primary Examiner*—Terry Lee Melius
*Assistant Examiner*—Victor Batson
*Attorney, Agent, or Firm*—Robert R. Hussey, Co. LPA

[57] ABSTRACT

A collapsible tool bar is provided for carrying agricultural earth-working tools and includes a normally horizontal main tool bar section and at least one outer wing section. The main and wing section are connected by a hinge which has a main hinge plate secured to one of the tool bar sections and a wing hinge plate secured to the other tool bar section. The hinge also includes an intermediate hinge plate connecting the main and wing hinge plates. The main hinge plate is rotatably attached to said intermediate hinge plate about a substantially vertical axis. Means are provided for selectively securing the main hinge plate to the intermediate hinge plate. The wing hinge plate is rotatably attached to the intermediate hinge plate about a substantially horizontal axis. Means are provided for urging said outer wing section in a downward direction when the main hinge plate is secured to the intermediate hinge plate.

20 Claims, 5 Drawing Sheets

5,558,164

COLLAPSIBLE TOOL BAR FOR AGRICULTURAL IMPLEMENTS

BACKGROUND OF THE INVENTION

The present invention relates generally to agricultural implements of the type having foldable tool bars including a central horizontal main section and a pair of outboard wing sections connected to a respective end portion of the tool bar. The wing sections are moveable between a substantially horizontally extended operative earth-working position where they may follow rolling ground conditions and a transport position which appreciably reduces the overall width of the implement.

In the farm industry, the trend toward more powerful tractors and the desirability to increase productivity and work larger areas of ground has resulted in increasing of the weight and working widths of implements. For example, some planters, discs, cultivators, fertilizers and other farm implements when mounted on a tool bar have a working path width in excess of forty feet. The use of foldable tool bar wings has facilitated passage of the implements through gates and over roads as well as storage of the implement. To increase the maneuverability of this size of implement for off field or road transit conditions, it is known to have some form of articulation of the tool bar support to decrease the width of the implement.

In this regard, a collapsible farm implement has a tool bar with a central horizontal main section attached to a wheeled frame or cart such as a wheeled trailer arrangement, and a pair of outboard tool bar wing sections connected to the central main tool bar section to move between a working position and a transport position. Farm tools such as planters, discs, cultivators, fertilizers and other such farm tools are mounted to the tool bar and spaced therealong so that a number of rows will be worked by the farm tools. The working or operational field use position of the tool bar positions the tool bar wing sections generally parallel to one another and extended in a direction generally crosswise to the direction of the farm implement travel. The width between the outer tips of the respective tool bar wing sections could thus exceed forty feet in the working position.

The transport position is provided by moving the tool bar wings to reduce the effective width of the implement. In the retracted, transport position, the implement has a much narrower width, comparable to the width of the tractor. When in the transport position, the collapsed implement has greatly increased maneuverability for travel down narrower roads, through gates, around turns, etc.

It is also desirable that when the tool bar is in the transport position, the working farm tools mounted on the tool bar are raised so that they do not contact the ground when in transit. Contact with the ground when in transit can damage the farm tools.

On the other hand, when the tool bar is in the working position, it is desirable to maintain the working farm tools in contact with the ground so that they effectively work the ground. It is desirable for a tool bar to have the capability of flexing in the field so that the tools may follow the contour of the ground and also the capability of being collapsed for transport. To maintain the farm tools in a working position, it is desirable to provide a downward force on the tool bar wings which is adjustable to accommodate varying field conditions such as the type of soil being worked.

Numerous mechanisms are known which allow a wing to be lifted, lowered and rigidly secured or locked to the main section when in the working position. These mechanisms allow the operator to lift the wing relative to the implement when transporting or storing the implement Some of such mechanisms are shown in U.S. Pat. Nos. 4,030,551; 4,046, 203; 4,061,195; and 4,700,784. Other mechanisms provide for folding the wings behind the main section of the implements as seen in U.S. Pat. No. 4,496,004. Other mechanisms provide for exerting a downward force on the tool bar as disclosed in U.S. Pat. 4,915,014.

A need has long been recognized in the farm industry for a reliable and simple mechanism for a collapsible implement which is durable and allows the wings to be secured in both the working and transport position. It is also desirable to provide a retractable tool bar that may be operated by one person.

SUMMARY OF THE PRESENT INVENTION

The present invention provides the above described desirable features with an improved collapsible tool bar for agricultural implements.

The present invention provides a collapsible tool bar for agricultural implements including a central horizontal main section and a pair of outboard wing sections connected to respective end portions of the tool bar. The central main tool bar section is attached to a wheeled cart or trailer which may be drawn by a tractor. Farm tools such as planters, discs, cultivators, fertilizers and other such farm tools are mounted to the tool bar and spaced therealong so that a number of rows will be worked by the farm implement tools. The wing sections are moveable between a substantially horizonal extended operative earth-working position where they may follow rolling ground conditions and a transport position which appreciably reduces the overall width of the implement.

The present invention provides a novel hinge for connecting the main tool bar section and a tool bar wing section which provides the advantageous features of the present invention. The hinge has a main hinge plate secured to one of the main or wing tool bar sections and a wing hinge plate secured to the other tool bar section. The hinge also includes an intermediate hinge plate connecting the main and wing hinge plates. The main hinge plate is rotatably attached to said intermediate hinge plate about a substantially vertical axis. Means are provided for selectively securing the main hinge plate to the intermediate hinge plate to restrict movement about the vertical axis. The wing hinge plate is rotatably attached to the intermediate hinge plate about a substantially horizontal axis. Means are provided for urging said outer wing section in a downward direction when the main hinge plate is secured to the intermediate hinge plate.

The hinge mechanism of the present invention allows the wing unit to be alternatively secured in a working position, or released and collapsed for transporting of the agricultural implement. To position the tool bar in the working position, the main and wing hinge plates are secured together with the tool bar sections generally parallel to one another and extending in a direction generally crosswise to the direction of the farm implement travel.

When the agricultural implement is moved across the ground, the the farm tools mounted on the tool bar work the ground. To follow rolling ground conditions of uneven terrain, the wings may move in a limited vertical direction and are urged in a downward direction to maintain an earth working position. A spring is provided to exert a downward force on the wing. The spring mounting allows for adjusting the downward force exerted by the spring on the wing to accommodate different ground conditions. For example, when the ground under one wing section is at a different height than the ground under the other wing, the force exerted by the spring can be easily adjusted so that each wing is maintained in an earth working position with the downward force.

The tool bar of the present invention is movable to a transport position by collapsing the tool bar wings to reduce the effective width of the implement. In the transport position the implement has a much narrower width, comparable to the width of the tractor. To move the wings from the working position to the transport position, the main and wing hinge plates are released from securement from each other so they are free to rotate about their vertical axis. Accordingly, the wings may be rotated towards the front or rear of the cart carrying the main tool bar section.

The vertical axis of rotation is preferably at an acute angle to a vertical line and in a direction away from said main tool bar section. The acute angle provides for raising the working farm tools mounted on the tool bar when in the transport position so that they do not contact the ground when in transit. Depending on the design parameters of the agricultural implement, the present invention allows for positioning the wing sections in either a forward or rearward position when the implement is in a transport position. If the design of the implement requires the positioning the wing sections in a forward position, the acute angle is towards the rear of the implement and consequently the main section of the tool bar. Accordingly when the wings are rotated from the working to the forward transport position they also rise a predetermined distance. If on the other hand, the design of the implement requires the positioning the wing sections in a rearward position, the acute angle is towards the front of the implement and consequently the main section of the tool bar. Accordingly when the wings are rotated from the working to the rearward transport position they also rise a predetermined distance.

Other desirable features and advantages of the present invention will become apparent from a study of the following description and the accompanying drawings which are illustrative of the invention.

BRIEF DESCRIPTION OF THE INVENTION

DETAILED DESCRIPTION OF THE INVENTION

Figure 1:
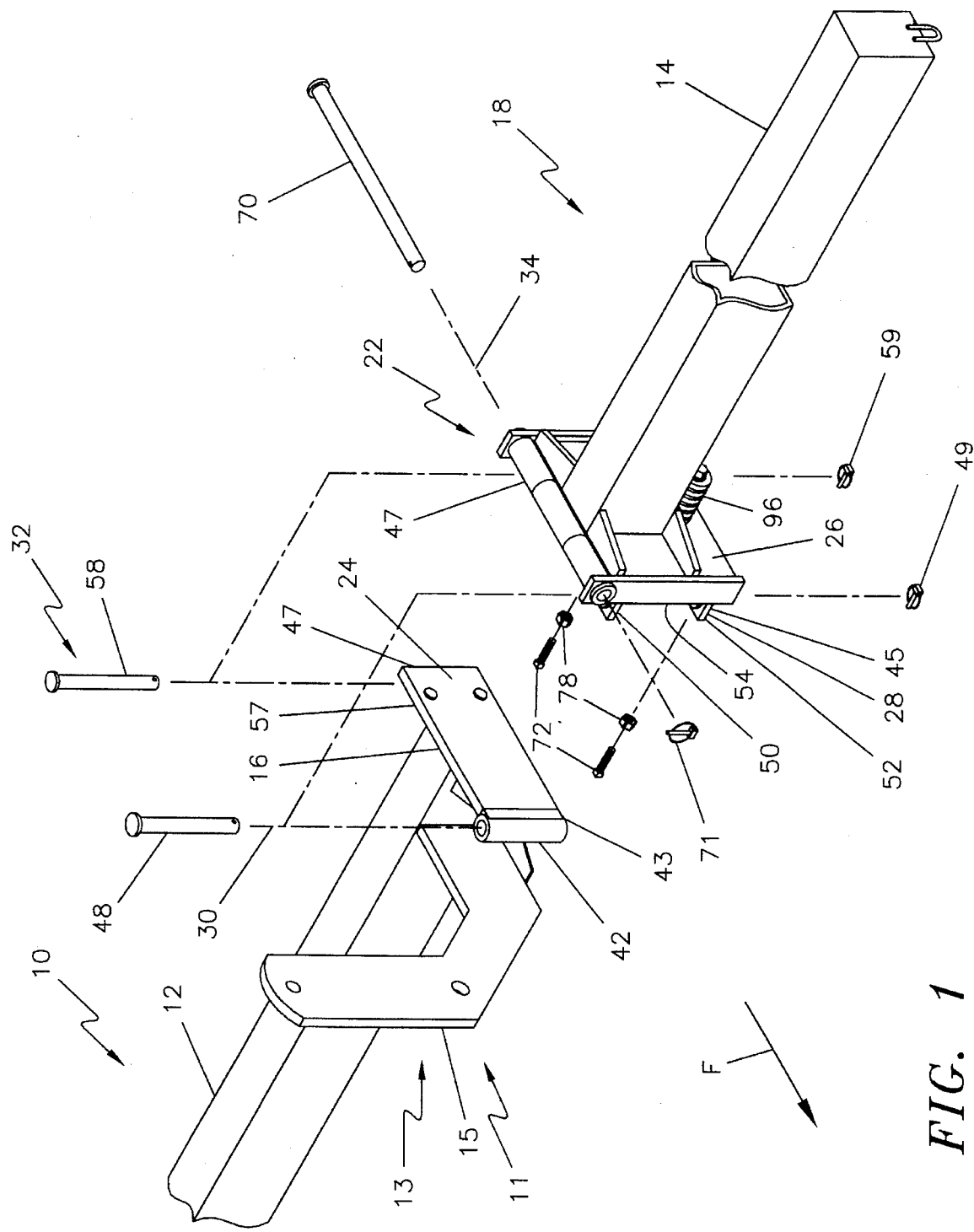
FIG. 1 is an exploded perspective view of a portion of the collapsible tool bar of the present invention.

The present invention provides a collapsible tool bar 10 for use in agricultural implements, schematically indicated at 11 in FIG. 1, for carrying agricultural earth-working tools.

The tool bar 10 includes a central horizontal main section 12 and a pair of outboard wing sections 14 connected to respective end portions of the tool bar. For ease of description, the drawings show one wing section 14 extending from the end 16 of the main tool bar section 12. It is to be understood that the other end of the main tool bar section 12 and its complementary wing section extending from the other end of the main section is a mirror image of the end 16 and the wing section 14. Only the wing section 14 shown in FIG. 1 and its connection to the end 16 of the main section 12 will be described hereinafter.

The central main tool bar section 12 is attached to a wheeled cart or trailer which may be drawn by a tractor. The trailer has a mounting bracket 15 which is secured to the main section 12 of the tool bar 10. It should be understood that any means may be provided for attachment of the main tool bar section 12 to the trailer 13.

Farm tools (not shown) such as any known planter, disc, cultivator, fertilizer tools and other such farm tools are mounted to the tool bar 10 and spaced therealong so that a number of rows may be worked by the farm implement tools. The wing sections 14 are moveable between a substantially horizontally extended operative earth-working position 18, indicated in FIGS. 1–5, where the tools work the ground and follow rolling ground conditions and a transport position 20, indicated in FIG. 6, which appreciably reduces the overall width of the implement 11.

The present invention provides a novel hinge 22 for connecting the main tool bar section 12 and a tool bar wing section 14 and provides the advantageous features of the present invention. The hinge 22 has a main hinge plate 24 secured to the end 17 of the main tool bar section 12 and a wing hinge plate 26 secured to the inboard end 17 of the wing section 14. The hinge 22 also includes an intermediate hinge plate 28 shown in FIGS. 2 and 4 connecting the main and wing hinge plates 24, 26 respectively. The main hinge plate 24 is rotatably attached to the intermediate hinge plate 28 about a substantially vertical axis 30 shown in FIGS. 3, 5 and 6 as will be hereinafter more fully described.

Means 32 are provided for selectively securing the main hinge plate 24 to the intermediate hinge plate 28 to restrict movement about the vertical axis 30, as shown in FIGS. 1, 3, 5 and 6. The wing hinge plate 26 is rotatably attached to the intermediate hinge plate 28 about a substantially horizontal axis 34 shown in FIGS. 2 and 4.

Means 35 are provided for limiting to an acute angle the amount of rotational movement of the wing 14 about the horizonal axis 34. Sufficient rotational movement of the wing 14 with respect to the main tool bar section 12 is permitted to allow the farm tools on the wing to follow the rolling ground conditions when the tool bar 10 is in the working position 18. Means 36 are provided for urging the outer wing section 14 in a downward direction particularly when the main hinge plate 24 is secured to the intermediate hinge plate 28.

The hinge mechanism 22 of the present invention allows the wing 14 to be alternatively secured in the working position 18, or released so the wing 14 may be moved to the transport position 20 for transporting of the agricultural implement 11. To position the tool bar 10 in the working position 18, the main and wing hinge plates 24, 26 respectively, are selectively secured together by the means 32 when the tool bar sections 12, 14 are generally parallel to one another and extend in a direction generally crosswise to the direction of the agricultural implement travel.

In the working position 18, the wings 14 may move in a limited vertical direction. To follow rolling ground conditions of uneven terrain, means 36 are provided to maintain a downward force on the wings 14 and consequently on the farm tools to keep the farm tools in working contact with the earth. When the ground under one wing section 14 is at a different height than the ground under the other wing or the main section 12, each wing is maintained in the earth working position 18 with the downward force. Means 38 are provided for adjustment of the downward force to compensate for various soil conditions as will be hereinafter more fully described.

Figure 6:
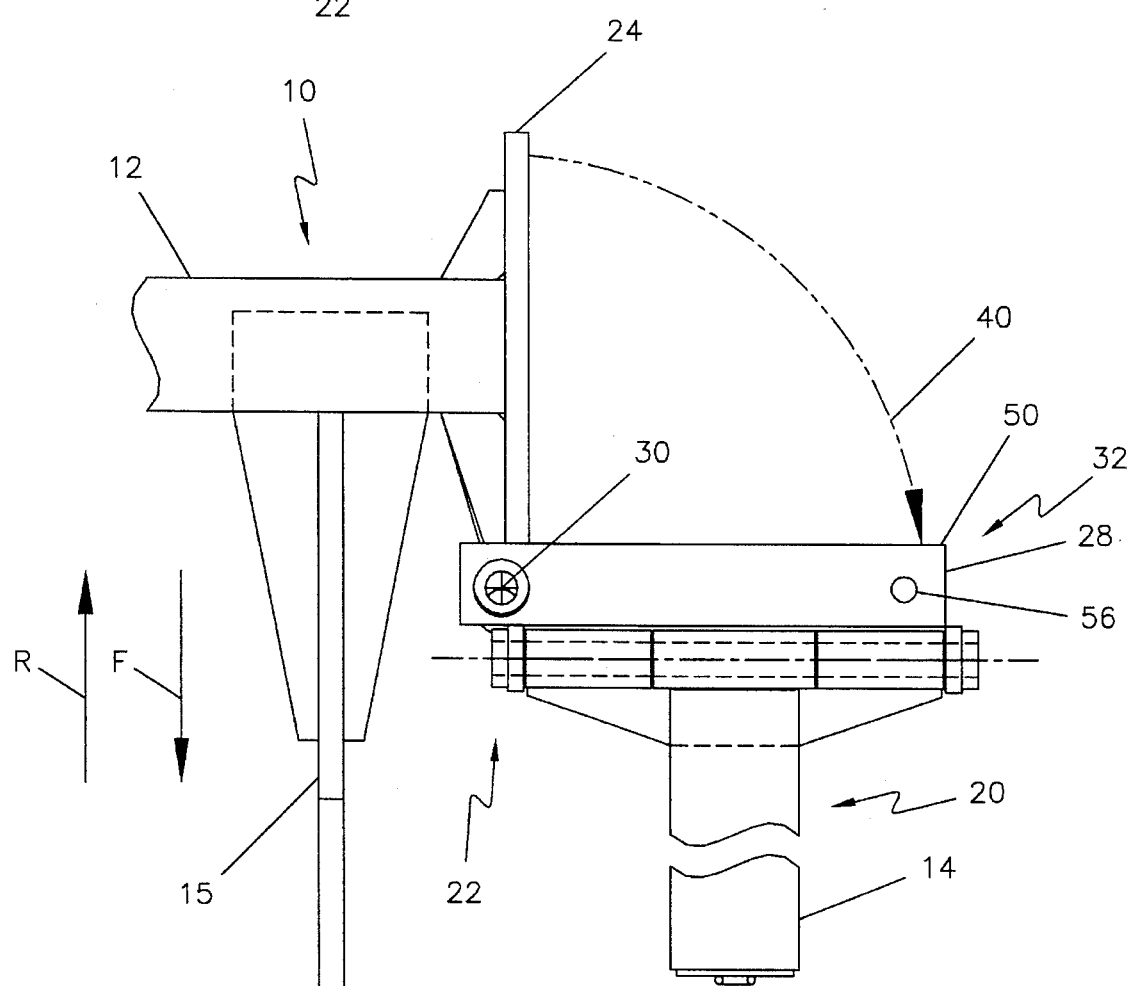
FIG. 6 is a top view of the tool bar shown in FIG. 3 in a transport position.

The tool bar 10 of the present invention is movable to a transport position 20 as shown in FIG. 6 by collapsing the tool bar wings to reduce the effective width of the implement 11. To move the wings 14 from the working position 18 to the transport position 20, the main and wing hinge plates 24, 26 respectively, are released from securement from each other by the means 32 so they are free to rotate about their vertical axis 30. The wings 14 may then be rotated towards the front or rear of the cart carrying the main tool bar section 12 depending on the requirements of the implement 11 and the design hinge 22.

Figure 5:
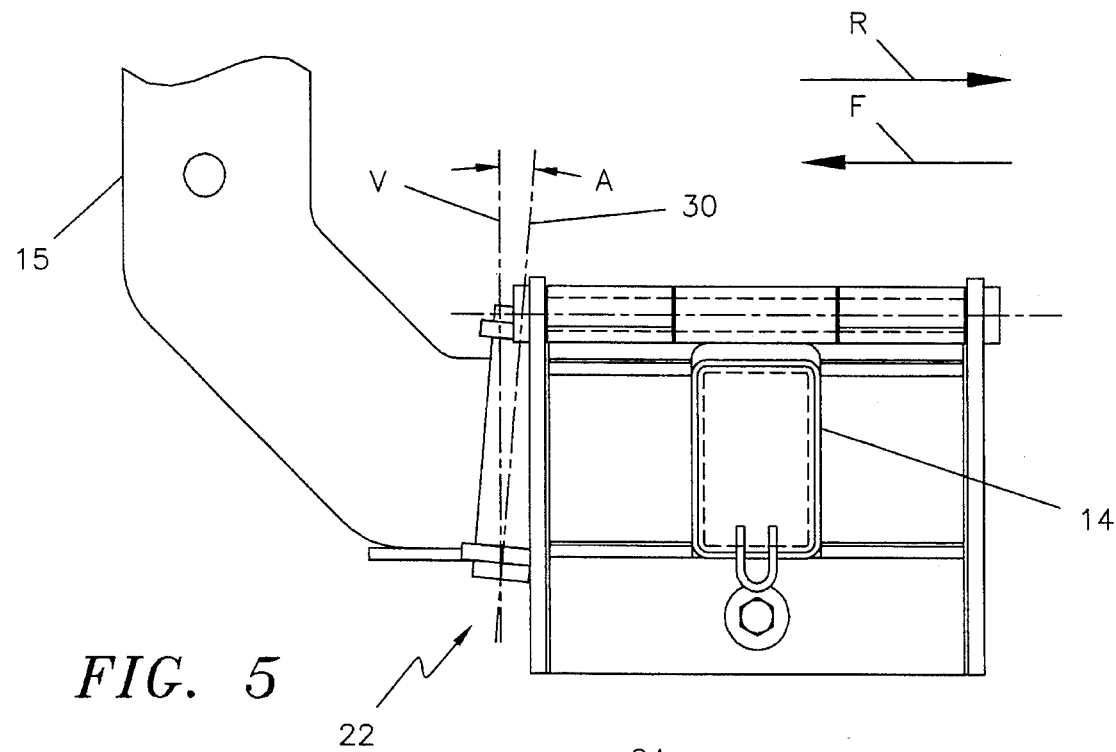
FIG. 5 is an end view of the tool bar shown in FIG. 3.

The vertical axis of rotation 30 is preferably at an acute angle "A" to a vertical line "V" and in a direction away from said main tool bar section 12 as shown in FIG. 5. The acute angle "A" provides for raising the working farm tools mounted on the tool bar 10 when in the forward transport position 20 so that they are raised from the ground when in transit.

Depending on the design parameters of the agricultural implement 11, the present invention allows for positioning the wing sections 14 in either a forward or rearward position when the implement is in a transport position. As shown in FIGS. 5 and 6, the wing section 14 is folded towards the front, indicated by the arrow "F" of the implement 11. The acute angle "A" is towards the rear, indicated by the arrow "R" of the implement 11 and consequently the rear of the main section 12 of the tool bar 10. The substantially vertical axis 30 is located adjacent the front end 43 of the main hinge plate 24 and the front end 45 of the intermediate hinge member 28. The acute angle "A" is toward the rear end portion 47 of the main and intermediate hinge plates 24, 28 respectively when the main and intermediate hinge plates is secured to each other. When the wings 14 are rotated from the working 18 to the forward transport position 20 in a direction indicated by the arrow 40, they also rise a predetermined distance. When it is desirable to raise the farm tools a greater distance, the angle "A" is increased. Consequently, the farm tools on the tool bar 10 are raised from the ground and can be readily transported without damaging contact with the ground.

Figure 7:
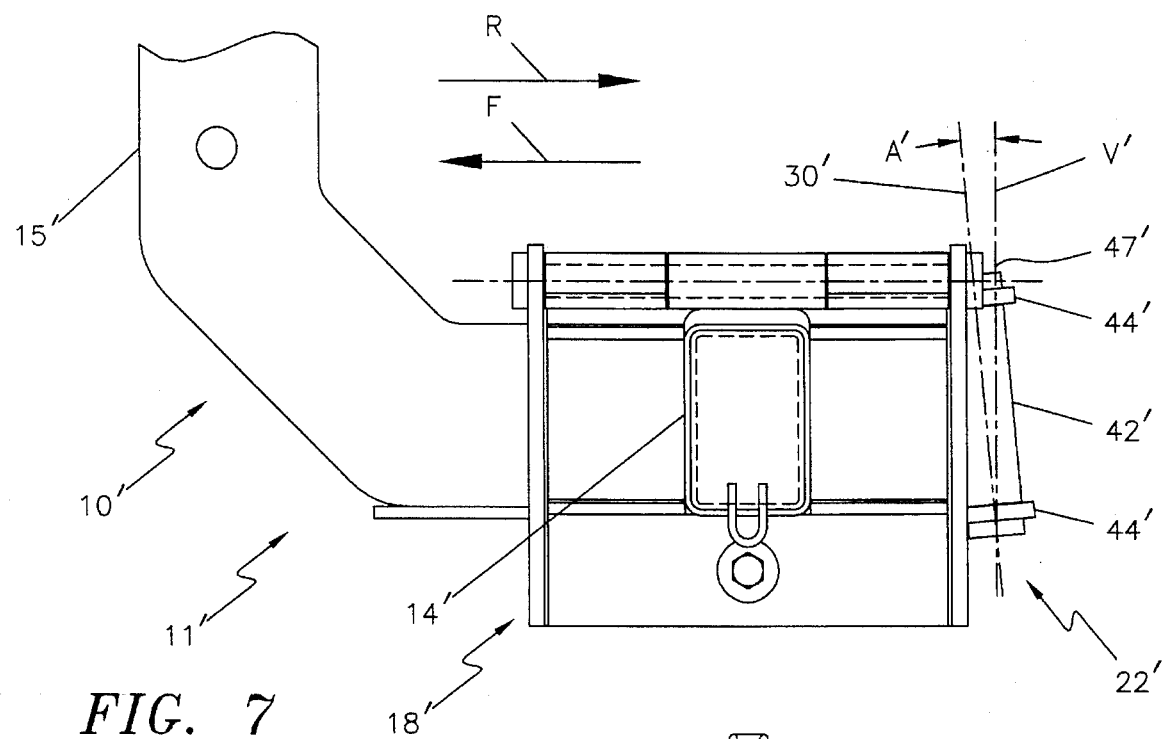
FIG. 7 is an end view of another embodiment of the tool bar shown in FIGS. 1–6.
Figure 8:
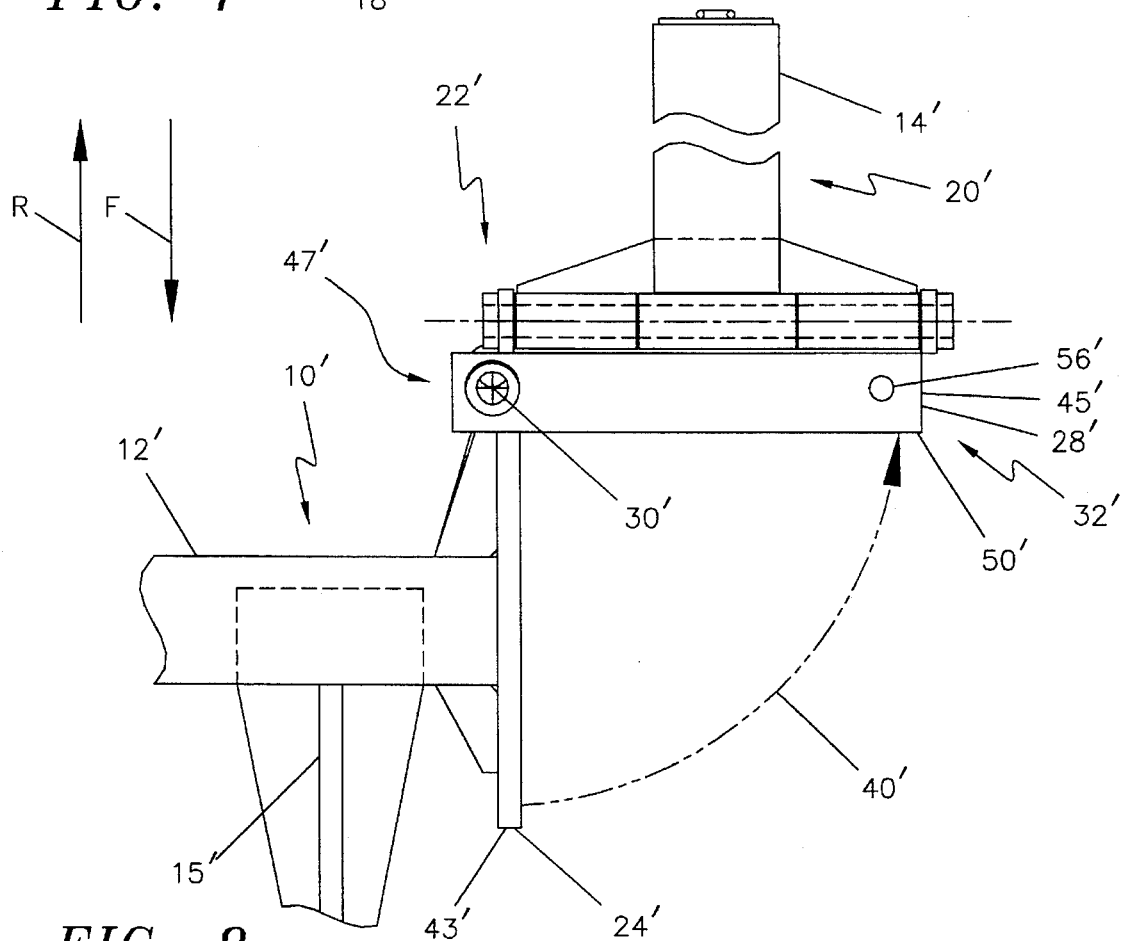
FIG. 8 is a top view of the tool bar shown in FIG. 7 in a transport position.

Another embodiment of the collapsible tool bar 10' of the present invention is shown in FIGS. 7 and 8 which provides for the wing sections 14' to fold to the rear and is similar in construction with the collapsible tool bar 10 described herein. For ease of description, the collapsible tool bar 10' is numbered with numerals the same as used in connection with the collapsible tool bar 10 to denote common parts where appropriate and followed by a prime mark "'" to denote the collapsible tool bar 10'.

If on the other hand, the design of the implement 11' as shown in FIGS. 7 and 8 requires folding the wing sections 14' toward the rear, indicated by the arrow "R", the acute angle "A'" is towards the front of the implement 11' from the vertical axis "V'" and consequently the front of the main section 12' of the tool bar 10'. The substantially vertical axis of rotation 30' at the acute angle A' is located adjacent the rear end 47' of the main hinge plate 24' and the intermediate hinge member 28' and opposite their forward ends 43' and 45' respectively. Accordingly, when the wings 14' are rotated from the working position 18' to a rearward transport position, they also rise a predetermined distance. It is within the contemplation of this invention that the axis 30' is vertical and the entire tool bar 10' is raised in the transport position 10'.

Figure 2:
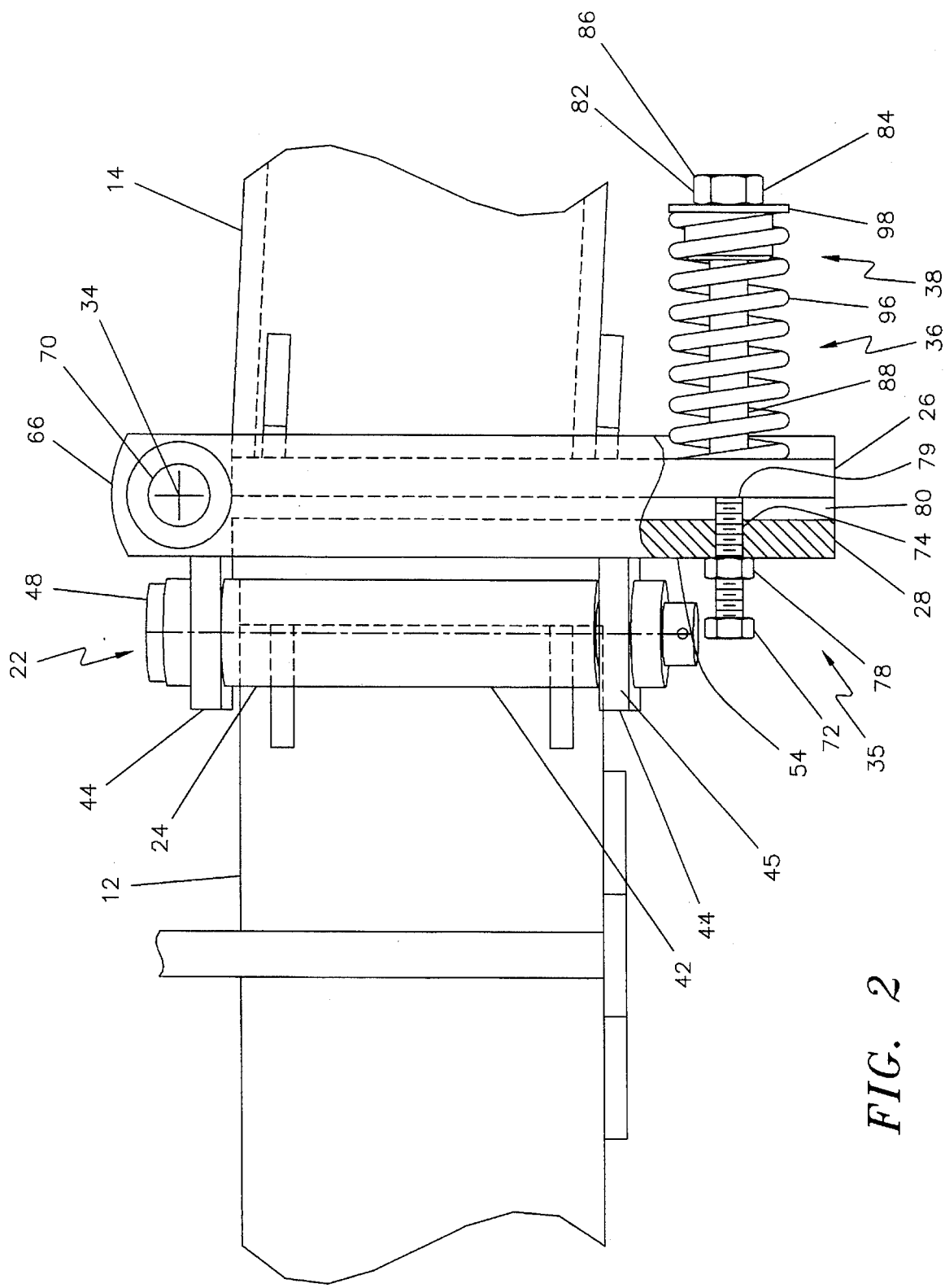
FIG. 2 is a front view of the tool bar shown in FIG. 1.

Referring now to the embodiment shown in FIGS. 1–6 to provide the rotational attachment of the main hinge plate 24 to the intermediate plate 28 as seen in FIGS. 1 and 2, the main hinge plate has a hinge knuckle portion 42 on the forward end 43 of the main hinge plate and the intermediate plate has knuckle portions 44 on its forward end 45 which are positioned above and below the knuckle portion 42 and interleaf with the knuckle portion 42. In an assembled position, the knuckle portions 42, 44 have an aperture 46 therethrough and along the axis 30 for receiving the pin 48 therethrough. Means, such as the fastener 49, are provided to secure the pin 48 in the aperture 46. Accordingly, the main and intermediate hinge plates 24, 28 respectively are rotationally attached about the axis 30.

Referring now to the embodiment shown in FIGS. 7 and 8, if it is desirable to rotate the wing 14' in a rearward direction, the knuckle portions 42', 44' are formed on the rearward end 47' of the hinge plates 24', 28' respectively. It should be understood that any known hinge connection may be provided between the hinge plates 24, 28 or 24', 28' so they are rotatable about the substantially vertical axis 30 or 30'.

Referring now to the embodiment shown in FIGS. 1–6, means 32 are provided for selectively securing the main hinge plate 24 to the intermediate hinge plate 28 to restrict movement about the vertical axis 30, as shown in FIGS. 1, 2, 5 and 6. The intermediate hinge plate 28 has upper and lower tab portions 50, 52 extending from the rear 54 of the intermediate plate and extend past the main hinge plate 24 when in the working position 18. The tab portions 50, 52 have an aperture 56 therethrough for receiving retaining pin 58 therethrough when the hinge 22 is in the working position 18. Rotational movement of the intermediate hinge 28 about the axis 30 is restrained by contact of the pin 58 with the inside surface 57 of the main hinge plate 24. Means, such as the fastener 59, is provided to selectively secure the pin 58 in place between the tabs 50, 52.

When it is desirable to move the wing 14 from the working position 18 to the transport position 20, the fastener 59 releases the pin 58 and the retaining pin 58 is removed from the aperture 56 of the tab portions 50, 52. The wing 14 is then free to rotate about the substantially vertical axis 30.

Figure 3:
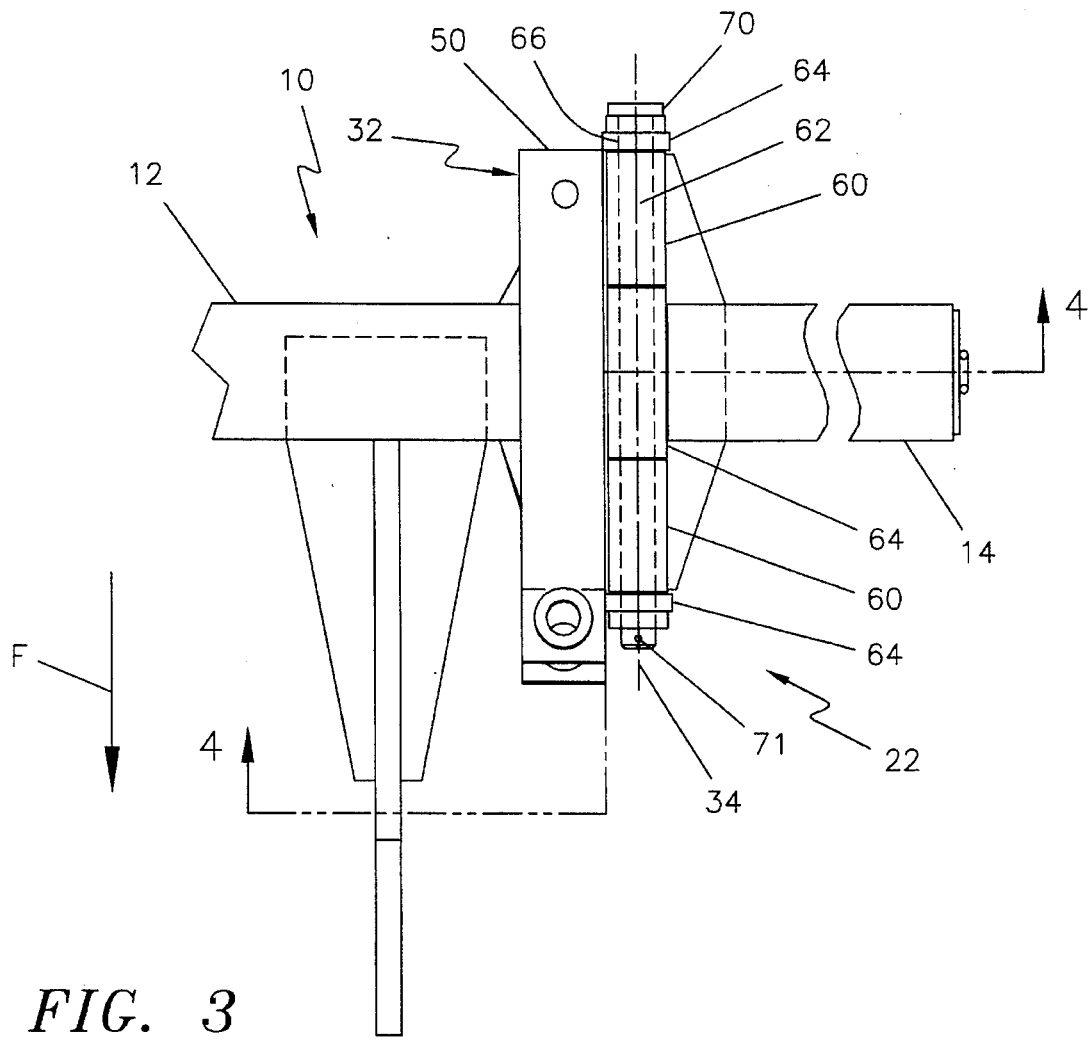
FIG. 3 is a top view of the tool bar shown in FIG. 2 in a working position.
Figure 4:
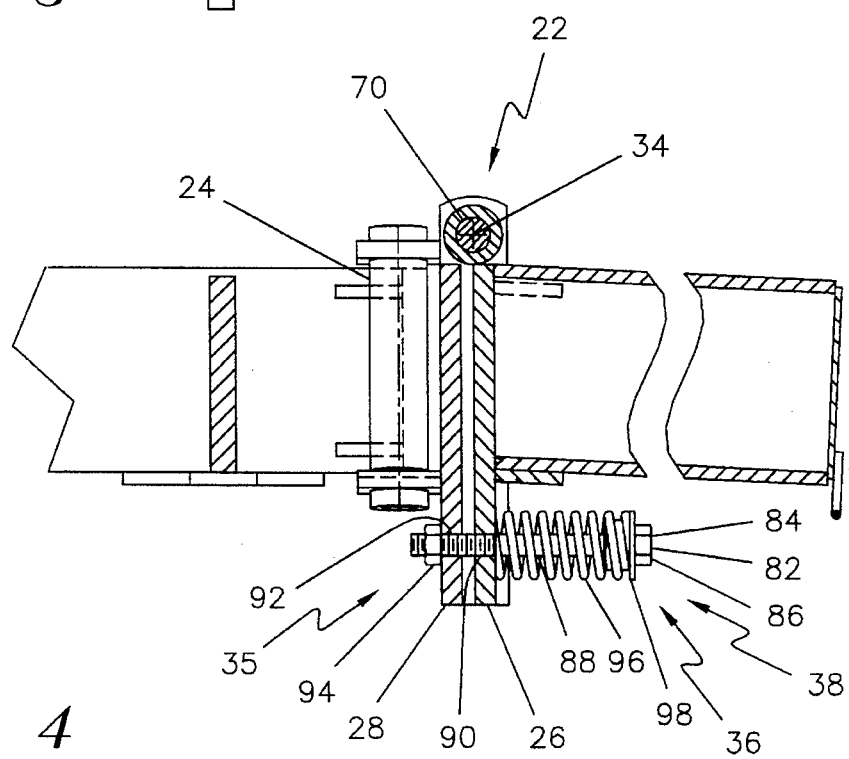
FIG. 4 is a partial sectional side view of the tool bar shown in FIG. 3 and taken along lines 4–4 thereof.

The wing hinge plate 26 is rotatably attached to the intermediate hinge plate 28 about a substantially horizontal axis 34 shown in FIGS. 2, 3 and 4. The wing hinge plate 26 has hinge knuckle portions 60 on the upper end 62 of the main hinge plate and the intermediate plate 28 has knuckle portions 64 on its upper end 66 which interleaf with the knuckle portions 60. In an assembled position, the knuckle portions 60, 64 have an aperture 68 therethrough and along the horizontal axis 34 for receiving the pin 70 therethrough. Means, such as the fastener 71 shown in FIG. 1, is provided to selectively secure the pin 70 in place between the knuckle portions 60, 64. Accordingly, the wing and intermediate hinge plates 26, 28 respectively are rotationally attached about the axis 34. It is within the contemplation of this invention to use other known connections that provide for rotatably mounting the main and intermediate hinge plates 24, 28 respectively and the wing and intermediate hinge plates 26, 28 respectively about the axes described herein.

Means 35 are provided for limiting the amount of rotational movement of the wing 14 about the horizonal axis 34 to an acute angle as shown in FIGS. 1 and 2 and as further described herein. The means 35 include threaded fasteners 72 threadedly engaging the threaded openings 74 in the front and rear ends 43, 47 of the bottom portion 76 of the intermediate hinge plate 28. Lock nuts 78 are provided to lock the position of the fasteners 72. The fasteners 72 are adjusted so that their ends 79 contact the inner surface 80 of the wing hinge plate 26 and limit the downward movement of the wing 14 to the desired distance. Sufficient movement of the wing 14 with respect to the main tool bar section 12 is permitted to allow the farm tools on the wing to follow the rolling ground conditions when the tool bar 10 is in the working position 18.

Means 36 are provided for urging the outer wing section 14 in a downward direction when the main hinge plate 24 is secured to the intermediate hinge plate 28, as seen in FIGS. 2 and 4. The means 36 includes a bolt 82 having a head or enlarged portion 84 on one end 86. The other end 88 of the bolt 82 is slidably received in the aperture 90 in the center of the bottom of the wing hinge plate 26 and threadedly engaged by a threaded aperture 92 in the center of the bottom of the intermediate hinge plate 28. A lock nut 94 is provided to lock the bolt 82 with respect to the intermediate hinge plate 28 as will be herein further described. A spring 96 is provided for mounting on the bolt 82 between the wing hinge plate 26 and the enlarged portion 84 of the bolt 82 for providing a downward force on the wing 14 as will be further described. A washer 98 is positioned on the bolt 82 between its head 84 and the spring 96 to provide a bearing surface for the spring.

When the wing 14 is in a working position 18, an upward force may be exerted on the wing such as when the height of the ground increases. The upward force urges the wing 14 in an upward direction and the spring 96 is compressed and forces the wing in a downward direction so that the farm tools mounted on the wing are maintained in contact with the ground. This situation occurs particularly in rolling ground conditions. The bolt 82 and spring 96 also serve to limit the upward movement of the tool bar wing 14. This function of the bolt 82 and spring 96 is included in the means 35 for limiting the amount of rotational movement of the wing 14 about the horizonal axis 34 to an acute angle.

Means 38 are provided for adjustment of the downward force to compensate for various soil conditions. For example, if the ground is hard, it is desirable to provide a greater downward force on the wing 14 so that the farm tools mounted on the wing will penetrate the ground. To increase the downward force on the wing 14, the bolt 82 is threaded a greater distance into the intermediate plate 28 so that the distance between the washer 98 and the wing hinge plate 26 is decreased and the spring 96 is compressed. The lock nut 94 is tightened to lock the bolt 82 in position on the intermediate hinge member 28. While the wing 14 can still move in an upward direction, a greater downward force is exerted on the wing 14. It is within the contemplation of this invention that other means to provide a downward force on the wing 14 and other means to adjust that force may be used. It is within the contemplation of this invention that other devices may be used to provide an adjustable downward force on the wing 14 when in a working position.

The invention has been described with reference to the preferred embodiments. Obviously, modifications and alterations will occur to others upon reading and understanding this specification. It is my intention to include all modifications and alterations insofar as they come within the scope of the appended claims or equivalents thereof.

Having described my invention, I claim:

1. A collapsible tool bar for carrying agricultural earth-working tools including:
   a) a normally horizontal main tool bar section,
   b) an outer wing section,
   c) a hinge connecting said sections,
   d) said hinge including a first hinge plate secured to one of said sections and a second hinge plate secured to the other of said sections and an intermediate hinge plate connecting said first and second hinge plates,
   e) said first hinge plate pivotally attached to said intermediate hinge plate about a substantially vertical axis,
   f) means for selectively securing said first hinge plate to said intermediate hinge plate against pivotal movement therebetween,
   g) said second hinge plate pivotally attached to said intermediate hinge plate about a substantially horizontal axis, and
   h) means for urging said outer wing section in a downward direction when said first hinge plate is secured to said intermediate hinge plate.

2. A collapsible tool bar for carrying agricultural earth-working tools as described in claim 1 in which said substantially vertical axis is at an acute angle to a vertical line and in a direction forwardly or rearwardly from said main tool bar section.

3. A collapsible tool bar for carrying agricultural earth-working tools as described in claim 2 in which each of said first and second hinge plates have a front and a rear end portion, said substantially vertical axis located adjacent one of said front and rear end portions and said acute angle is toward the other of said end portions.

4. A collapsible tool bar for carrying agricultural earth-working tools as described in claim 1 in which said means for urging includes means for maintaining a downward force on said wing section.

5. A collapsible tool bar for carrying agricultural earth-working tools as described in claim 4 which includes means for adjusting the downward force on said wing section.

6. A collapsible tool bar for carrying agricultural earth-working tools as described in claim 1 which includes means for limiting the amount of rotational movement of said wing section about said horizonal axis.

7. A collapsible tool bar for carrying agricultural earth-working tools as described in claim 6 in which said means for limiting the amount of rotational movement of said wing section about said horizonal axis includes means for adjusting the amount of rotational movement permitted.

8. A collapsible tool bar for carrying agricultural earth-working tools as described in claim 1 in which said means for selectively securing said first hinge plate against pivotal movement to said intermediate hinge plate is releasable for permitting rotation of one of the first and intermediate hinge plates about said substantially vertical axis.

9. A collapsible tool bar hinge for connecting a normally horizontal main tool bar section and an outer wing section carrying agricultural earth-working tools including:
   a) a first hinge plate secured to one of said sections and
   b) a second hinge plate secured to the other of said sections
   c) an intermediate hinge plate connecting said first and second hinge plates, d) said first hinge plate pivotally attached to said intermediate hinge plate about a substantially vertical axis, e) means for selectively securing said first hinge plate to said intermediate hinge plate against pivotal movement therebetween, f) said second hinge plate pivotally attached to said intermediate hinge plate about a substantially horizontal axis, and g) means for urging said outer wing section in a downward direction.

10. A collapsible tool bar hinge for connecting a normally horizontal main tool bar section and an outer wing section carrying agricultural earth-working tools as described in claim 9 in which said substantially vertical axis is at an acute angle to a vertical line and in a direction forwardly or rearwardly from the main tool bar section.

11. A collapsible tool bar hinge for connecting a normally horizontal main tool bar section and an outer wing section carrying agricultural earth-working tools as described in claim 10 in which said first and second hinge plates have a front and a rear end portion, said substantially vertical axis located adjacent one of said front and rear end portions and said acute angle is toward the other of said end portions.

12. A collapsible tool bar hinge for connecting a normally horizontal main tool bar section and an outer wing section carrying agricultural earth-working tools as described in claim 9 in which said means for urging includes means for maintaining a downward force on the wing section.

13. A collapsible tool bar hinge for connecting a normally horizontal main tool bar section and an outer wing section carrying agricultural earth-working tools as described in claim 12 which includes means for adjusting the downward force on the wing section when said first hinge plate is secured to said intermediate hinge plate.

14. A collapsible tool bar hinge for connecting a normally horizontal main tool bar section and an outer wing section carrying agricultural earth-working tools as described in claim 9 which includes a means for limiting the amount of rotational movement of the wing section about said horizonal axis.

15. A collapsible tool bar hinge for connecting a normally horizontal main tool bar section and an outer wing section carrying agricultural earth-working tools as described in claim 14 in which said means for limiting the amount of rotational movement of the wing section about said horizonal axis includes means for adjusting the amount of rotational movement permitted.

16. A collapsible tool bar hinge for connecting a normally horizontal main tool bar section and an outer wing section carrying agricultural earth-working tools as described in claim 9 in which said means for selectively securing said first hinge plate against pivotal movement to said intermediate hinge plate is releasable for permitting rotation of one of the first and intermediate hinge plates about said substantially vertical axis.

17. A collapsible tool bar hinge for connecting a normally horizontal main tool bar section and an outer wing section carrying agricultural earth-working tools including:

a) a first hinge plate secured to one of said sections and b) a second hinge plate secured to the other of said sections c) said first hinge plate pivotally attached to said second hinge plate about a substantially horizontal axis, and d) means for urging said outer wing section in a downward direction including a spring mounting member adjustably secured to said first hinge plate and positioned through an aperture in said second hinge plate, said spring mounting member having an enlarged portion, a spring positioned between said enlarged portion and said second hinge plate having one end in contact with said second hinge plate and another end in contact with said enlarged portion of said spring mounting member.

18. A collapsible tool bar hinge for connecting a normally horizontal main tool bar section and an outer wing section carrying agricultural earth-working tools as described in claim 17 in which said spring mounting member includes a threaded portion threadedly engaging a complimentary threaded aperture in said first hinge plate for adjusting the downward force exerted by said spring.

19. A collapsible tool bar hinge for connecting a normally horizontal main tool bar section and an outer wing section carrying agricultural earth-working tools as described in claim 17 which includes means for limiting the amount of rotational movement of said wing about said substantially horizonal axis.

20. A collapsible tool bar hinge for connecting a normally horizontal main tool bar section and an outer wing section carrying agricultural earth-working tools as described in claim 17 having a third hinge plate connecting said first and second hinge plates, said first hinge plate pivotally attached to said third hinge plate about a substantially vertical axis, means for selectively securing said first and said third hinge plate against pivotal movement therebetween, said second hinge plate pivotally attached to said third hinge plate about a substantially horizontal axis.

* * * * *